(12) United States Patent
Heuver

(10) Patent No.: US 10,161,426 B2
(45) Date of Patent: Dec. 25, 2018

(54) TRANSMISSION AND TRANSMISSION CLUTCH SYSTEM

(71) Applicant: Ford Global Technologies, LLC, Dearborn, MI (US)

(72) Inventor: Bradley Ronald Heuver, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 343 days.

(21) Appl. No.: 15/080,910

(22) Filed: Mar. 25, 2016

(65) Prior Publication Data

US 2017/0276152 A1   Sep. 28, 2017

(51) Int. Cl.
F16D 25/063 (2006.01)
F16D 25/12 (2006.01)
F15B 15/14 (2006.01)
F16D 25/062 (2006.01)
F16D 25/0638 (2006.01)
F16H 57/02 (2012.01)
F16D 13/52 (2006.01)
F16H 61/30 (2006.01)
F16J 1/09 (2006.01)

(52) U.S. Cl.
CPC ...... *F15B 15/1447* (2013.01); *F15B 15/1414* (2013.01); *F16D 13/52* (2013.01); *F16D 25/062* (2013.01); *F16D 25/063* (2013.01); *F16D 25/0638* (2013.01); *F16D 25/12* (2013.01); *F16H 57/02* (2013.01); *F16H 61/30* (2013.01); *F16J 1/09* (2013.01); *F16D 2300/08* (2013.01); *F16H 2057/02047* (2013.01)

(58) Field of Classification Search
CPC ...... F16D 25/0638; F16D 25/12; F16D 13/52; F16H 61/30; F15B 15/1447; F16J 1/09
See application file for complete search history.

(56) References Cited

U.S. PATENT DOCUMENTS

| 3,915,274 | A  |   | 10/1975 | Utter    |             |
|-----------|----|---|---------|----------|-------------|
| 4,741,422 | A  | * | 5/1988  | Fuehrer  | F16D 25/12  |
|           |    |   |         |          | 192/106 F   |
| 4,759,432 | A  | * | 7/1988  | Jurgens  | F16D 25/0638|
|           |    |   |         |          | 192/106 F   |
| 6,378,682 | B1 | * | 4/2002  | Mohan    | F16D 25/0638|
|           |    |   |         |          | 192/103 F   |
| 6,382,382 | B1 | * | 5/2002  | Avny     | F16D 25/0638|
|           |    |   |         |          | 192/106 F   |
| 8,534,437 | B2 | * | 9/2013  | Wilton   | F16D 25/0638|
|           |    |   |         |          | 192/106 F   |
| 2015/0260237 | A1 |  | 9/2015 | Saito et al. | |

* cited by examiner

Primary Examiner — Ramya P Burgess
Assistant Examiner — Lillian T Nguyen
(74) Attorney, Agent, or Firm — James Dottavio; Brooks Kushman P.C.

(57) ABSTRACT

A transmission includes a case, a clutch pack, a piston. The case defines a bore that transitions along a step from a first to a second diameter. The piston is disposed within the bore. The piston has first and second seals that engage the case along the first and second diameters, respectively. The piston defines a chamber that is encompassed by the piston, the case, the first seal, and the second seal. The piston is configured to engage a clutch pack when hydraulic fluid is channeled into the chamber.

19 Claims, 3 Drawing Sheets

TRANSMISSION AND TRANSMISSION CLUTCH SYSTEM

TECHNICAL FIELD

The present disclosure relates to transmissions and clutch systems utilized in transmissions.

BACKGROUND

Vehicle transmissions, transaxles, or other mechanisms that employ more than one gearing ratio between an input and an output, may transition between various gear ratios by engaging and disengaging various clutches. The clutches may comprise alternating friction plates and separator plates that are configured to selectively couple two rotating elements (shafts, gears, etc.).

SUMMARY

A transmission includes a case, a clutch pack, a piston. The case defines a bore that transitions along a step from a first to a second diameter. The piston is disposed within the bore. The piston has first and second seals that engage the case along the first and second diameters, respectively. The piston defines a chamber that is encompassed by the piston, the case, the first seal, and the second seal. The piston is configured to engage a clutch pack when hydraulic fluid is channeled into the chamber.

A clutch engagement piston includes a piston body and a degassing valve. The piston body has an exterior surface that defines a first diameter, a second diameter, and a step between the first and second diameters. First and second seals extend from the exterior surface at the first and second diameters, respectively. The degassing valve is disposed adjacent to the step and is configured to exhaust gas located in an exterior space defined by the exterior surface to an interior space defined by an interior surface of the body.

A clutch includes a clutch pack and a piston configured to engage the clutch pack to activate the clutch. The piston includes an outer surface that defines a first diameter, a second diameter, and a step between the first and second diameters. The piston also includes first and second seals extending from the outer surface at the first and second diameters, respectively. Each seal is configured to engage a transmission case. The piston further includes an anti-rotation device that extends from the outer surface and is configured to engage the transmission case to prevent piston rotation such that a degassing valve is maintained at a top center location of the transmission case.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
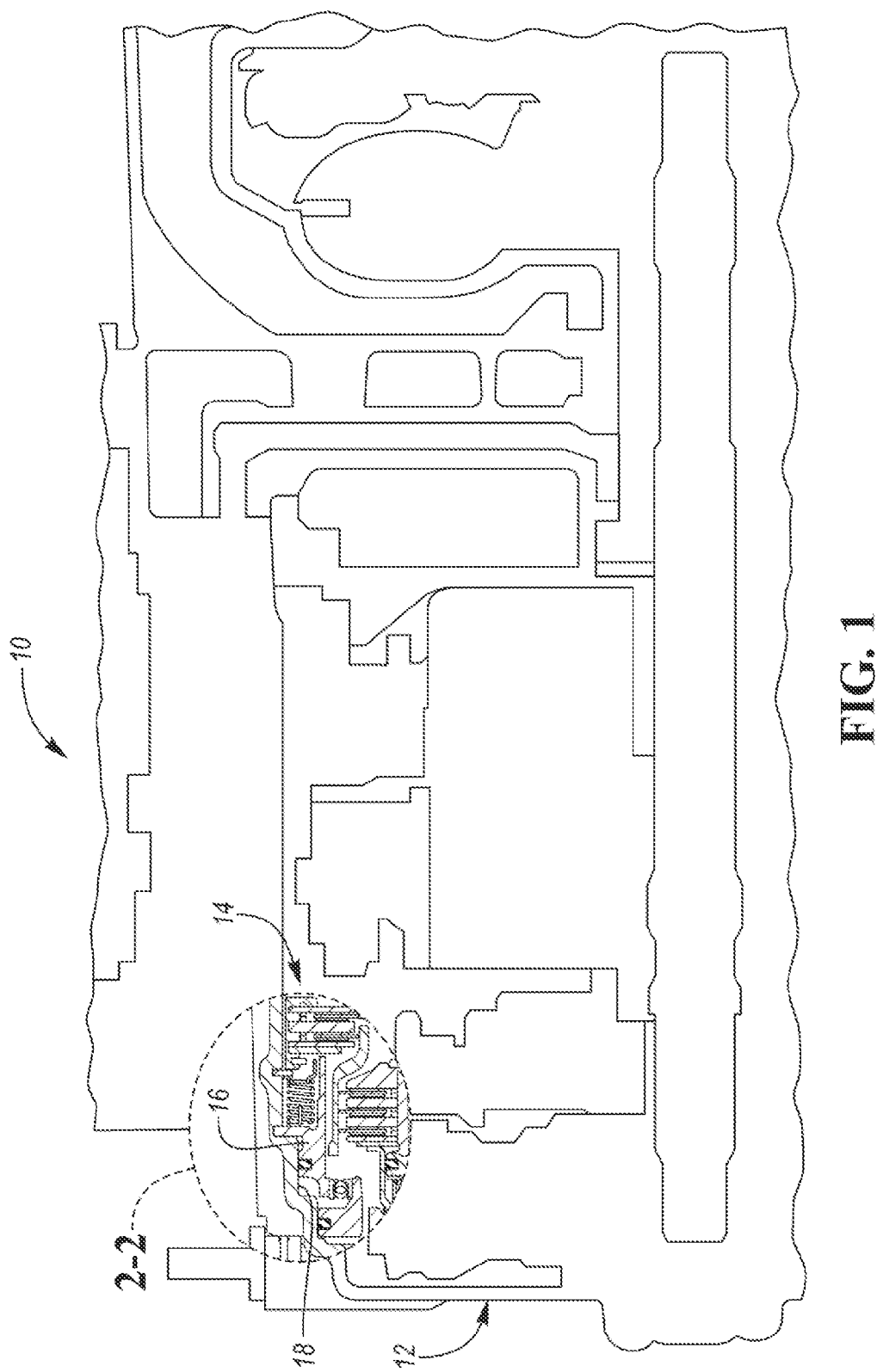
FIG. 1 is a partial cross-section representative of the internal workings of a transmission or transaxle.

Referring to FIG. 1, a partial cross-section representative of the internal workings of a transmission 10 (or transaxle) is illustrated. The transmission 10 includes a transmission case 12 that houses rotating elements such as gears, shafts, etc. A gearing arrangement within the transmission 10 is a collection of these rotating elements (gears, shafts, etc.) and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. The transmission 10 may be a discrete ratio transaxle that has a shiftable gearing arrangement that selectively imposes a variety of speed ratios between an input shaft and an output shaft of the transmission.

A group of elements (gears, shafts, etc.) are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one way clutches. A clutch that holds an element against rotation by selectively connecting the element to the housing may be called a brake.

Hydraulically actuated clutches may be engaged when hydraulic fluid forces a piston into contact with a clutch pack, consisting of alternating friction plates and separator plates. The friction plates may fixed to a first rotating element while the separator plates are fixed to a second rotating element, or vice versa. Alternatively, the friction plates may be connected to a first rotating element while the separator plates are grounded to a transmission case, or vice versa. A hydraulic clutch 14 is disposed within the transmission case 12. The hydraulic clutch 14 includes a piston 16 that engages an internal bore 18 that is defined by the transmission case 12.

Figure 2:
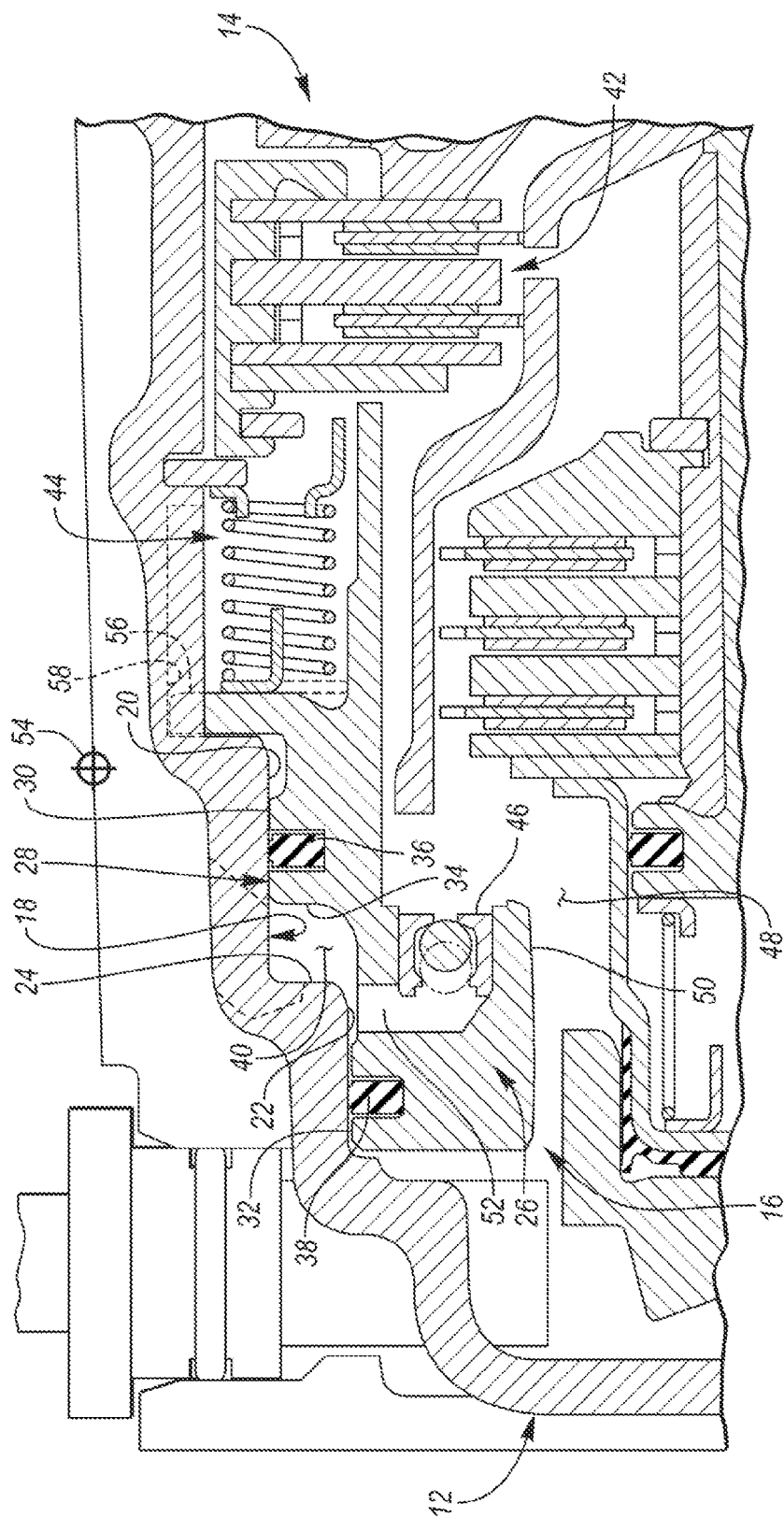
FIG. 2 is an enlarged view of the area encompassed by Area 2-2 shown in FIG. 1.

Referring to FIG. 2 an enlarged view of the area encompassed by Area 2-2 in FIG. 1 further illustrates the hydraulic clutch 14 and internal bore 18 that is defined by the transmission case 12. The internal bore 18 transitions from a first bore diameter 20 to a second bore diameter 22 along a bore step 24. The first bore diameter 20 may be larger than the second bore diameter 22. The piston 16 includes piston body 26 that has an outer or exterior surface 28. The exterior surface 28 of the piston body 26 defines a first piston diameter 30 and a second piston diameter 32. The exterior surface 28 of the piston body 26 may include a step 34 between the first piston diameter 30 and second piston diameter 32. The first piston diameter 30 may be larger than the second piston diameter 32. The piston may include a first seal 36 and a second seal 38. The first seal 36 may extend from the exterior surface 28 of the piston body 26 at the first diameter 30. The first seal 36 is configured to engage the bore 18 along the first bore diameter 20. The second seal 38 may extend from the exterior surface 28 of the piston body 26 at the second diameter 32. The second seal 38 is configured to engage the bore 18 along the second bore diameter 22.

A chamber 40 is defined between the transmission case 12 and the piston 16 adjacent to the bore step 24 and the step 34 located on the exterior surface 28 of the piston body 26. The chamber 40 is encompassed by the piston 16, the transmission case 12, the first seal 36 and the second seal 38. The piston 16 is configured to engage a clutch pack 42 when hydraulic fluid is channeled into the chamber 40. When the piston 16 engages the clutch pack 42, alternating friction plates and separator plates, that are connected to first and second rotating elements respectively, are forced into contact causing the first and second rotating elements to rotate as one unit. Alternatively, the alternating friction plates and separator plates may be connected to a first rotating element and grounded to the transmission case 12, respectively. When the piston 16 engages the clutch pack 42 in this alternative configuration, the first rotating element will be prevented from rotating or braked. The hydraulic clutch 14 in this alternative configuration may be referred to as a brake.

An advantage of having a piston 16 with a first seal 36 and a second seal 38 located on offset services (i.e., the first piston diameter 30 and second piston diameter 32) that engage offset surfaces (i.e., the first bore diameter 20 and second bore diameter 22) of an internal bore 18 defined by a transmission case 12, allows for the formation of a chamber 40 between the piston 16 and the transmission case 12 which receives hydraulic fluid in order actuate the piston to engage the clutch pack 42. Otherwise, a chamber configured to receive hydraulic fluid would have to be formed between two walls within the transmission case 12. Forming a chamber between two walls within the transmission case 12 may be difficult and costly to manufacture on a large scale, since precision machining (which is required to form the smooth surfaces on the transmission case 12 that engage the first seal 36 and second seal 38) would be required in a tight space with little clearance for tooling during machining operations.

A hydraulic valve (not shown) may be configured to open and close in order to allow hydraulic fluid to flow into and out of the chamber 40 as desired to engage and disengage the clutch pack 42. The hydraulic valve may include an electrical solenoid that receives signals from a controller in order to transition between open and closed positions.

A return spring 44 may be configured to disengage the piston 16 and the clutch pack 42 when disengagement is desired and may assist in forcing hydraulic fluid out of the chamber 40. When the piston 16 and clutch pack 42 are engaged, the hydraulic fluid within the chamber 40 may be exposed to a mechanical device that increases the pressure of the hydraulic fluid within the chamber 40, such as a pump. The hydraulic fluid within the chamber 40 may then be isolated at the increased pressure. When disengagement of the piston 16 and clutch pack 42 are desired, the hydraulic fluid within the chamber 40 will remain isolated from the mechanical device that increases the pressure of the hydraulic fluid and will be exposed to a lower pressure (e.g., atmospheric pressure) such that the force generated by return spring 44 is capable of forcing the hydraulic fluid out of the chamber 40.

The piston 16 may have a degassing valve 46. The degassing valve 46 may be configured to exhaust gas from an exterior space (e.g., the chamber 40) that is defined by the exterior surface 28 of the piston body 26 to an interior space 48 that is defined by an interior surface 50 of the piston body 26. The degassing valve 46 may be located adjacent to or in the proximity of the step 34 located on the exterior surface 28 of the piston body 26. The piston body 26 may define a channel 52 that fluidly communicates the chamber 40 to the interior space 48. The degassing valve 46 may be disposed within the channel 52. The degassing valve 46 may be located circumferentially on the piston 16 adjacent to a top center location 54 of the transmission case 12.

The degassing valve 46 may be a check valve. If the degassing valve 46 is a check valve, the degassing valve 46 may include a ball that is configured to rest upon a valve seat in order to prevent hydraulic fluid from flowing across the valve when the hydraulic pressure on one side of the valve reaches a predetermined threshold forcing the ball into contact with the valve seat. The ball may include a spring the forces the ball out of contact with the valve seat when the pressure on one side of the valve falls below the predetermined threshold. The degassing valve 46, if a check valve, maybe rated to allow air or gas to flow across the valve while not allowing hydraulic fluid to flow across the valve. Alternatively, the piston body 26 may include a small hole or orifice as opposed to the degassing valve 46.

The piston 16 may include an anti-rotation device 56 that engages the transmission case 12 to prevent rotation of the piston 16 relative to the transmission case 12 such that the degassing valve 46 remains adjacent to the top center location 54 of the transmission case 12. It may be advantageous to ensure that the degassing valve 46 is maintained at the top center location 54 such that air or gas may flow up through the chamber and across the degassing valve 46 while the chamber 40 is filling with hydraulic fluid.

Figure 3:
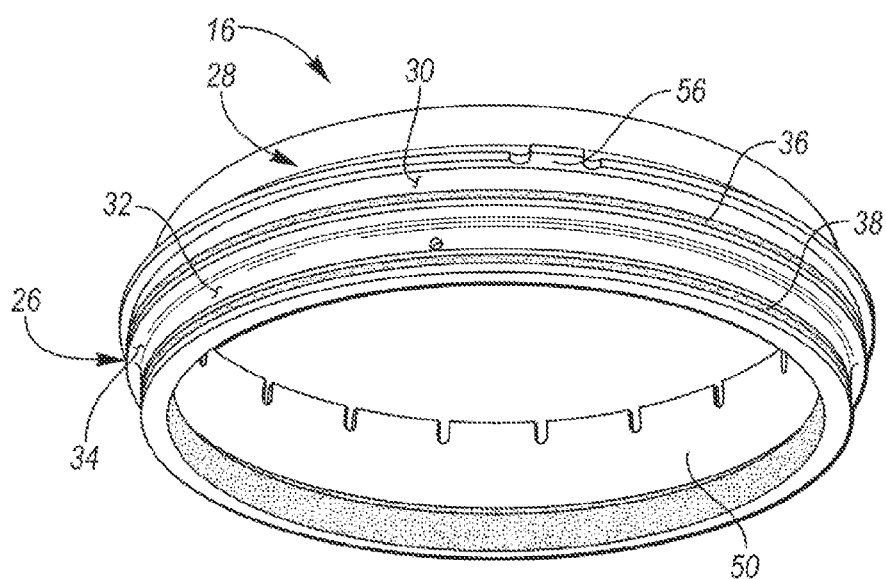
FIG. 3 is a perspective view of a clutch engagement piston.
Figure 4:
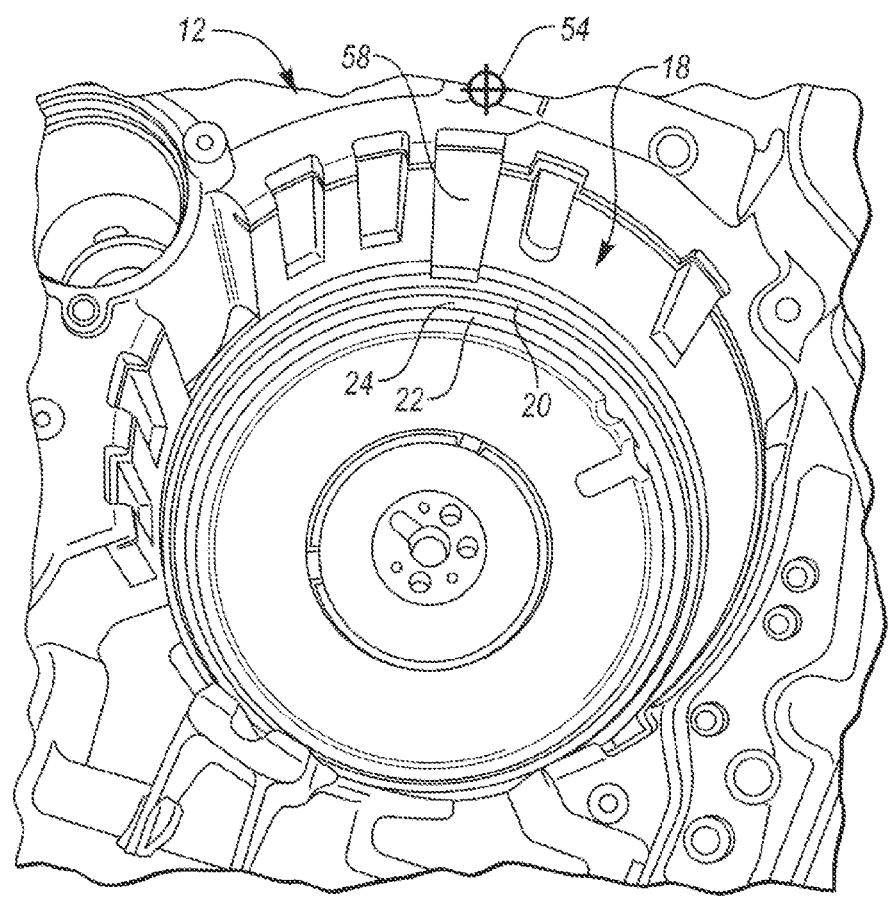
FIG. 4 is a perspective view of a transmission or transaxle case.

Referring to FIGS. 3 and 4, the clutch engagement piston 16 and the transmission case 12 are illustrated, respectively. FIG. 3 illustrates the exterior surface 28 of the piston body 26, the first piston diameter 30, the second piston diameter 32, the step 34 between the first piston diameter 30 and second piston diameter 32, the first seal 36, the second seal 38, the interior surface 50 of the piston body 26, and the anti-rotation device 56. FIG. 4 illustrates the internal bore 18, the first bore diameter 20, the second bore diameter 22, the bore step 24, and the top center location 54 of the transmission case 12. The anti-rotation device 56 may extend from the exterior surface 28 of the piston body 26. The anti-rotation device 56 may be a protrusion or tab that extends from the piston body 26 and is configured to engage a slot 58 defined by the transmission case 12.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A transmission comprising:
   a case defining a bore that transitions along a step from a first to a second diameter; and
   a piston disposed within the bore, having first and second seals engaging the case along the first and second diameters, respectively, and defining a chamber encompassed by the piston, case, first seal, and second seal, wherein the piston is configured to engage a clutch pack when hydraulic fluid is channeled into the chamber, and wherein the piston includes a degassing valve that is configured to exhaust gas from the chamber to an interior of the piston.

2. The transmission of claim 1, wherein the piston defines a channel that fluidly communicates the chamber to the interior of the piston, and wherein the degassing valve is disposed within the channel.

3. The transmission of claim 1, wherein the degassing valve is located circumferentially on the piston adjacent to a top center location of the case.

4. The transmission of claim 3, wherein the piston includes an anti-rotation device that is configured to prevent rotation of the piston such that the degassing valve remains adjacent to the top center location.

5. The transmission of claim 4, wherein the anti-rotation device is a protrusion that extends from the piston and engages a slot defined by the case.

6. A clutch engagement piston comprising:
   a piston body having an exterior surface defining first and second diameters, and a step between the diameters;
   first and second seals extending from the exterior surface at the first and second diameters, respectively; and
   a degassing valve disposed adjacent to the step and configured to exhaust gas located in an exterior space defined by the exterior surface to an interior space defined by an interior surface of the body.

7. The piston of claim 6, wherein the piston body defines a channel that fluidly communicates the exterior space with the interior space, and wherein the degassing valve is disposed within the channel.

8. The piston of claim 6, further comprising an anti-rotation device configured to engage a transmission case to prevent rotation of the piston such that the degassing valve remains adjacent to a top center location of the case.

9. The piston of claim 8, wherein the anti-rotation device is a protrusion that extends from the piston body and is configured to engage a slot defined by the transmission case.

10. The piston of claim 6, wherein a chamber is defined adjacent to the step and between the piston body and a transmission case when the piston is disposed within a bore defined by the transmission case, and wherein the piston is configured to engage a clutch pack when hydraulic fluid is channeled into the chamber.

11. The piston of claim 10, wherein the chamber is encompassed by the piston body, transmission case, first seal, and second seal.

12. The piston of claim 11, wherein the degassing valve is configured to exhaust gas from the chamber to the interior space when the piston is disposed within the bore of the transmission case.

13. A clutch comprising:
    a clutch pack; and
    a piston configured to engage the clutch pack to activate the clutch and having,
       an outer surface defining a first diameter, a second diameter, and a step between the first and second diameters,
       first and second seals extending from the outer surface at the first and second diameters, respectively, each seal configured to engage a transmission case, and
       an anti-rotation device extending from the outer surface and configured to engage the transmission case to prevent piston rotation such that a degassing valve is maintained at a top center location of the transmission case.

14. The piston of claim 13, wherein the degassing valve is disposed adjacent to the step and configured to exhaust gas from an exterior space relative to the piston to an interior space relative to the piston.

15. The piston of claim 14, wherein the piston defines a channel that fluidly communicates the exterior space with the interior space, and wherein the degassing valve is disposed within the channel.

16. The piston of claim 13, wherein the anti-rotation device is a protrusion that extends from the piston and is configured to engage a slot defined by the transmission case.

17. The piston of claim 13, wherein a chamber is defined adjacent to the step and between the piston and the transmission case when the piston is disposed within a bore defined by the transmission case, and wherein the piston is configured to engage the clutch pack when hydraulic fluid is channeled into the chamber.

18. The piston of claim 17, wherein the chamber is encompassed by the piston, transmission case, first seal, and second seal.

19. The piston of claim 18, wherein the degassing valve is configured to exhaust gas from the chamber to an interior space relative to the piston when the piston is disposed within the bore of the transmission case.

* * * * *